United States Patent [19]

True

[11] 3,932,727
[45] Jan. 13, 1976

[54] ELECTRICALLY HEATED RISER PIPE FOR A FLUID SUPPLY SYSTEM

[76] Inventor: Cecil Wayne True, 825 S. Maple St., Watertown, S. Dak. 57201

[22] Filed: Dec. 11, 1973

[21] Appl. No.: 423,712

[52] U.S. Cl. .................. 219/301; 137/297; 138/33; 138/111; 219/311; 219/315; 219/523; 219/535
[51] Int. Cl.² ... H05B 3/02; F16L 53/00; F24H 1/12
[58] Field of Search .......... 219/301, 535, 315, 311, 219/523, 528, 549; 138/111, 32, 33, 149; 137/341, 302, 301, 297

[56] References Cited
UNITED STATES PATENTS

| | | | |
|---|---|---|---|
| 1,140,864 | 5/1915 | Aubery | 219/535 X |
| 1,489,444 | 4/1924 | Kestler | 138/33 |
| 1,971,387 | 8/1934 | Scoville | 219/535 X |
| 2,075,686 | 3/1937 | Wiegand | 219/523 UX |
| 2,367,368 | 1/1945 | Osterheld | 219/311 X |
| 2,565,993 | 8/1951 | Schmid et al. | 137/301 X |
| 2,578,280 | 12/1951 | Barnard | 219/301 UX |
| 3,120,600 | 2/1964 | True | 219/301 |
| 3,151,633 | 10/1964 | Shuman | 138/111 X |
| 3,269,422 | 8/1966 | Matthews | 165/172 X |
| 3,275,803 | 9/1966 | True | 219/301 X |
| 3,305,668 | 2/1967 | Smith | 219/535 X |
| 3,784,785 | 1/1974 | Noland | 219/301 |

*Primary Examiner*—A. Bartis
*Attorney, Agent, or Firm*—LaValle D. Ptak

[57] ABSTRACT

A prefabricated water supply system for supplying water from an underground source to mobile homes or stock tank waterers and the like includes a riser pipe encased within an outer pipe spaced from the riser pipe. A third hollow pipe is located adjacent to the riser pipe and parallel to it. The space between the outer pipe and the riser pipe and third hollow pipe is filled with a rigid polyurethane foam insulation. A heat tape controlled by a thermostatic switch is located within the third pipe and a pair of end caps are used to hold the unit together. The provision of the third hollow pipe for the heat tape permits ready insertion and removal of the heat tape even after the unit has been installed in the ground under a mobile home or a stock tank waterer. An access opening aligned with the upper end of the third pipe is provided in the top end cap for facilitating this replacement and removal.

12 Claims, 3 Drawing Figures

U.S. Patent   Jan. 13, 1976   3,932,727
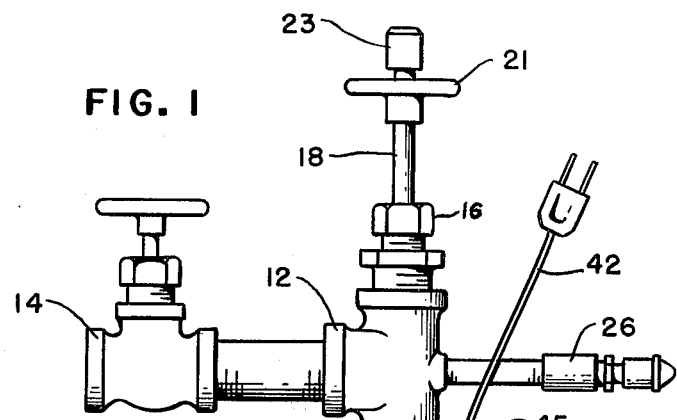
FIG. 1
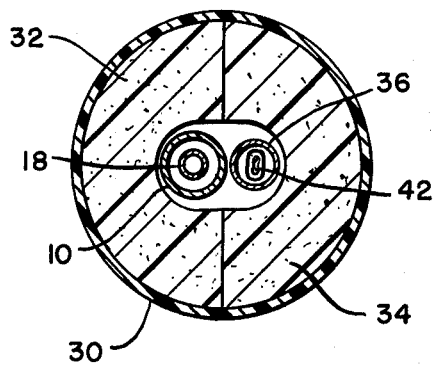
FIG. 2
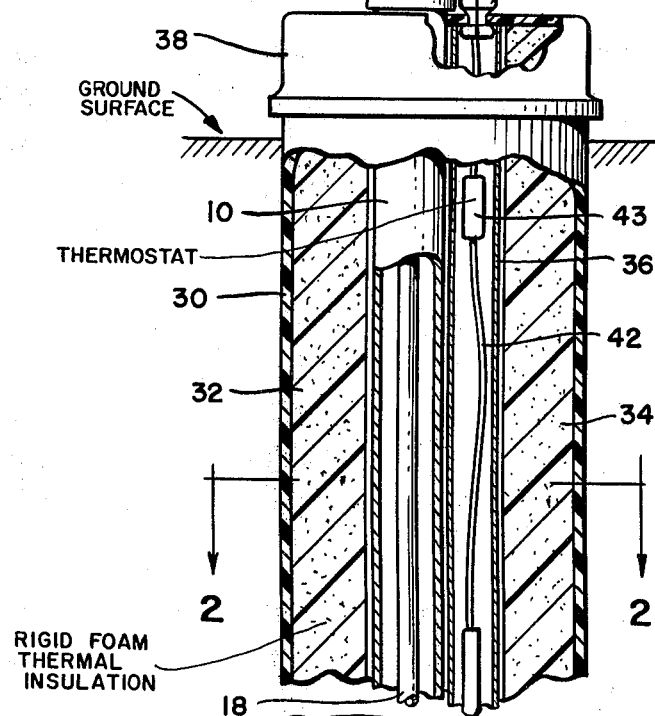
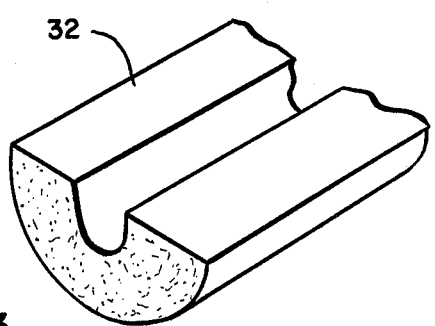
FIG. 3
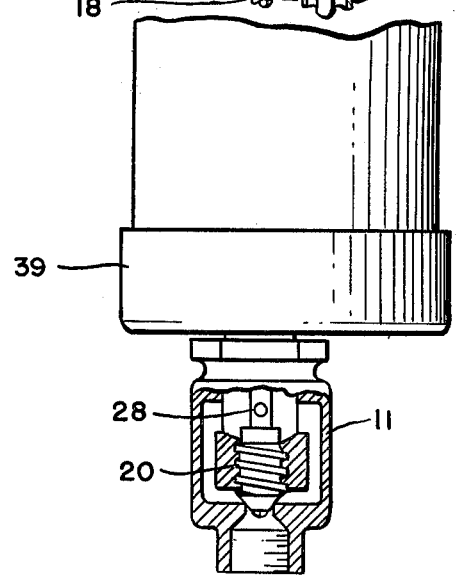

ELECTRICALLY HEATED RISER PIPE FOR A FLUID SUPPLY SYSTEM

BACKGROUND OF THE INVENTION

In regions where sub-freezing temperatures persist for prolonged periods of time sufficient to cause the ground to become frozen, water supply systems for mobile homes, stock tank waterers and the like are subject to freezing of water in the riser pipe connected between the mobile home or stock tank waterer and the underground water supply pipe located below the frost line.

If the water in the riser pipe freezes, it blocks the pipe, interrupting the flow of water, and often bursts the pipe. This problem is especially severe when water is supplied intermittently or stands in the riser pipe for long periods of time.

A solution to this problem is given in applicant's U.S. Pat. No. 3,120,600 in which the riser pipe is wrapped with a heat tape covered with insulation and located within an outer pipe. The riser pipe with the surrounding heat tape encased in the outer pipe is prefabricated as a unit and then is utilized in place of the conventional riser pipe for use in mobile home or stock tank waterer installations.

While the prefabricated units of this earlier patent have given satisfactory service in a large number of installations, it is necessary to remove the top cap and valve assembly to replace the heat unit if the heat unit should ever fail. This means that the water supply must be turned off if it ever does become necessary to replace a heat unit.

In the installation of the prefabricated riser pipe assemblies for a mobile home court or the like, it is necessary to install and connect the riser pipe assemblies prior to the time that any of the mobile homes are moved into place for service by the individual riser pipe systems. Since the mobile homes are not moved into place until some subsequent time, no rentals or sales are effective until later. Thus, it is desirable to reduce the initial cost of the water supply system as much as possible.

SUMMARY OF THE INVENTION

It is an object of this invention to provide a liquid supply system which overcomes the disadvantages found in prior art systems.

It is another object of this invention to provide an electrically heated water supply system in which the heating element can be easily installed and removed.

It is still another object of this invention to provide an electrically heated water supply system in which the heating element may be readily installed and removed without disturbing the water supply portion of the assembly.

It is still another object of this invention to provide an underground freezeless water supply system which is economical to manufacture.

In accordance with the preferred embodiment of this invention, a liquid supply system is prefabricated as a unit to be used as the riser pipe assembly for mobile homes, stock tank waterers and the like. The assembly includes an outer pipe with an inside diameter which is substantially greater than the outside diameter of the riser pipe. A pair of end caps close the ends of the outer pipe and the riser pipe passes through the end caps which effect a relative spacing between the riser pipe and the outer pipe. This space is filled with insulation which also has a cylindrical cavity in it parallel to the riser pipe for receiving an electrical heating means.

In a more specific embodiment, the cavity in the insulation accommodates a third hollow pipe which is parallel to the liquid supply pipe and this third pipe receives a thermostatically controlled electric heat tape.

BRIEF DESCRIPTION OF THE DRAWING

FIG. 1 is a partially cut away view of a preferred embodiment of the invention;

FIG. 2 is a cross-section taken along the line 2—2 of FIG. 1; and

FIG. 3 shows additional details of the embodiment shown in FIGS. 1 and 2.

DETAILED DESCRIPTION

Referring now to the drawing, in which the same reference numbers designate the same elements in all of the figures, there is shown a water supply system including a riser pipe 10 terminating at its lower end in a valve 11. In the installation of the water supply system, the valve 11 is connected to an underground water supply line (not shown) which is located below the frost line. The upper end of the riser pipe 10, is connected through a "T" 12 and a globe valve 14 to a suitable utilization device such as a mobile home or a stock waterer (not shown).

The other outlet of the T 12 has a bushing 16 in it through which passes a hollow rod 18, which extends all the way inside the riser pipe 10 to the valve 11. The lower end of the hollow rod 18 is rigidly attached to the valve poppet 20 for the valve 11; so that rotation of the rod 18 can be used to effect the opening and closing of the valve 11 at the bottom of the unit. A handle 21 is secured to the upper end of the rod 18 which extends through the handle 21 and is capped by a threaded cap 23. In normal usage the cap 23 is in place and prevents water from passing through the hollow rod 18.

To evacuate water from the riser pipe 10 when the unit is not in use, the handle 21 first is rotated clockwise to thread the poppet 20 downwardly to close the valve 11. The cap 23 is removed and the globe valve 14 also is closed. Air under pressure then is introduced into the T 12 through a conventional air valve 26 of the type commonly used in pneumatic tires. The valve 26 terminates a hollow pipe which opens into the T 12. Introduction of air through the valve 26 forces the water downwardly out of the riser pipe 10, through an opening 28 at the lower end of the hollow rod 18, and out its upper end where the cap 23 has been removed. Using this technique, all of the water can be evacuated from the riser pipe when the unit is not in use.

Under normal circumstances, however, water is supplied, often intermittently, through the riser pipe 10 to a utilization device in areas where the riser pipe 10 necessarily must pass through a zone of temperatures which are below the freezing point of water. Because of this, it is necessary to prevent the water in the pipe 10 from freezing to avoid the inconvenience of an interrupted water supply and possibly even severe damage due to bursting of the riser pipe 10.

The remainder of the elements shown in the drawing are employed for the purpose of preventing the water in the riser pipe 10 from freezing. These elements include an outer pipe casing 30, preferably made of styrene alloy plastic and having an inside diameter sufficiently larger than the outside diameter of the riser pipe 10 to form a space between the two pipes. This space preferably is filled with a preformed styrofoam or polyurethane insulation constructed as two rigid half cylindrical sections 32 and 34. These sections are each of a generally U-shaped configuration, as most clearly shown in FIGS. 2 and 3. The dimensions of the polyurethane foam insulation sections 32 and 34 are chosen to substantially fill the cavity between the riser pipe 10 and the outer pipe 30.

The riser pipe 10 is placed to one side of the center line of the finished assembly and essentially fills the U-shaped cavity in the section 32. The cavity in the section 34 preferably has placed in it a hollow metal pipe 36 which is parallel to the riser pipe 10 and adjacent to it.

The assembly which has been described thus far is held together by an above ground end cap 38 and a below ground end cap 39 which preferably are made of molded styrene alloy plastic. Each cap 38 and 39 has a sleeve portion which just fits over the outside of the outer pipe 30. The ends of the riser pipe 10 pass through a hole located just to the left of the center of the caps 38 and 39, as viewed in FIG. 1.

The entire unit then is clamped together by screwing on the valve 11 at the threaded lower end of the riser pipe 10 and by screwing on the T 12 at the upper end of the riser pipe 10. This moves the caps 38 and 39 toward one another until the ends of the outer pipe 30 engage the shoulders or ends of the caps 38 and 39. Further tightening of the valve 11 and the T 12 causes a compression force to be applied to the outer pipe 30 and a tensioning force to be applied to the riser pipe 10. This clamps the assembly firmly together. A second opening is provided to the right of the axis or center line of the unit as viewed in FIG. 1 directly in line with the open end of the hollow pipe 36.

This second opening is made large enough so that an electric heat tape or heat cable 42, with a thermostat switch 43 can be dropped through the opening into the pipe 36. The heat tape is lowered into the pipe 36 to a depth near or below the anticipated frost line in which the unit is to be installed. The thermostat switch 43 is located near the upper end of the pipe 36 to subject it to the temperatures to which the unit is subjected. The heat tape 42 is supplied with electricity from a suitable source of alternating current electricity (not shown). When the thermostat switch 43 closes in response to temperature drops near the freezing point of water, heat generated by the tape 42 prevents freezing of water in the riser pipe 10. The insulation sections 32 and 34 confine the heat to the area occupied by the two pipes 10 and 36. When the temperature rises to above the freezing point of water, the thermostat switch 43 opens to turn off the supply of electricity to the tape 42.

Preferably a rubber grommet 45 or similar device is used to seal the hole in the upper cap 38 over the open end of the pipe 36 and to tightly engage the heat tape 42. The grommet 45 is removable so that if the heat tape 42 ever should fail in operation of the device, the grommet can be removed and the heat tape 42 then can be withdrawn from the pipe 36 without disturbing any of the plumbing internal to the prefabricated unit or attached to it. This also makes it possible to install the heat tape 42 at any time after the rest of the unit is installed. Thus, it is not necessary to include the heat tape until the unit actually is going to be used by connecting it to a mobile home or other utilization device.

It should be noted that if the heat conductive properties of the metal pipe 36 are not desired, it can be eliminated and the heat tape 42 then can be lowered directly into the cavity formed within the insulation member 34.

It is not necessary to provide a water tight seal between the caps 38 and 39 if preformed styrofoam or polyurethane foam insulation is used since such insulation does not absorb water and does not lose any of its insulating properties if it is submerged in water. If other types of insulation are employed, it may be desirable to employ a water tight seal between the outer pipe 30 and the end caps 38 and 39.

Although the foam sections 32 and 34 are shown as identical or symmetrical sections, this is not necessary. It is preferable that they are symmetrical, however, to minimize the inventory required to fabricate the unit. If the cavities in the insulation sections 32 and 34 were not exactly the same, such as with one being deeper than the other, then, of course, the holes in the end caps 38 and 39 necessarily would need to be located in alignment with the respective cavities in the insulation members 32 and 34. The operation and utilization of the unit, however, would not be affected by this modification.

The water supply system which has been described may be preassembled, so that installation at the place of use merely involves connection of the underground water supply pipe to the valve 11 at the bottom and connection of the valve 14 to the utilization device at the top. Although particular materials have been described in conjunction with various ones of the different parts of the water supply system, other materials with comparable characteristics could be substituted if desired. In some installations it may be desirable to locate the thermostat switch 43 outside the assembled unit above the grommet 45. This permits a greater latitude of shapes and sizes of thermostat switches to be used, since the switch then would not have to be dimensioned to pass through the second opening and the pipe 36.

I claim:

1. A liquid supply supply system including in combination:

a rigid liquid supply pipe for supplying liquid from an underground supply source to an aboveground utilization point;

a rigid outer pipe with an inside diameter substantially greater than the outside diameter of said liquid supply pipe for encasing said liquid supply pipe with a space therebetween;

an above ground end cap and a below ground end cap on said outer pipe, each end cap having at least one opening for permitting passage of said supply pipe therethrough;

rigid foam thermal insulation means substantially filling the space between said supply pipe and said outer pipe;

an elongated straight cavity in said insulation means including therein a predetermined portion of the length of said supply pipe and having an open upper end, the cavity extending from the above ground end cap downwardly toward said below ground end cap, said predetermined portion of said supply pipe having its outer periphery exposed along one side in said cavity, an elongated electric heating means removably positioned in said cavity alongside the exposed portion of said supply pipe and in heat exchange relationship therewith; and said above ground end cap having a second opening therein aligned with the open upper end of said cavity and being of such size and shape as to allow removal of said elongated heating means from said cavity through said second opening irrespective of connections made to said supply pipe.

2. The combination according to claim 1 further including means for clamping said end caps to said liquid supply pipe and said outer pipe to form a unitary structure.

3. The combination according to claim 1 further including a third rigid hollow pipe within said cavity parallel to and adjacent said liquid supply pipe removably receiving said electrical heating means.

4. The combination according to claim 1 wherein said insulation means comprises preformed foam insulation of a substantially elongated hollow shape, said liquid supply pipe and the elongated cavity being located within the elongated hollow insulation.

5. The combination according to claim 4 wherein said foam insulation is comprised of two preformed portions, each having a cross-section of substantially U-shaped configuration.

6. The combination according to claim 5 wherein each of said first and second foam insulation pieces have identical mating configurations placed together in abutting relationship to form a cavity for receiving said liquid supply pipe and further providing said cavity alongside said liquid supply pipe.

7. The combination according to claim 6 further including a third pipe located within said cavity, said third pipe being parallel to said liquid supply pipe and substantially in abutting relationship thereto and receiving said electric heating means.

8. The combination according to claim 7 wherein said electric heating means comprises an electric heat tape.

9. The combination according to claim 8 wherein said third pipe is a metal pipe having good heat transfer characteristics.

10. The combination according to claim 8 further including a thermostat located in said cavity in said insulation means and connected to said heat tape to control electric current flowing through said heat tape in response to temperature variations.

11. A water supply system for supplying water from an underground source to an above-ground point of use including in combination:

a rigid riser pipe;

a rigid outer pipe with an inside diameter substantially greater than said riser pipe for encasing said riser pipe with a space therebetween;

a third rigid pipe located in heat exchange relationship in close proximity alongside said riser pipe and parallel thereto said third pipe having an open upper end;

a preformed rigid thermal insulation member substantially filling the space between said outer pipe and said riser pipe and said third pipe;

first and second end caps on said outer pipe and each having a first opening therein through which said riser pipe passes for establishing and maintaining the spaced relationship of said riser pipe and said outer pipe;

means for clamping said end caps to said riser pipe and said outer pipe to form a unitary closed structure;

said first end cap located at the aboveground end of said riser pipe and having a second opening aligned with said open upper end of said third pipe for providing access thereto; and electric heat tape means removably positioned in said third pipe a predetermined distance for heating said riser pipe to prevent water therein from freezing, said second opening being of such size and shape as to permit removal of said heat tape means from said third pipe through said second opening.

12. The combination according to claim 11 wherein said heat tape further includes a thermostatic switch connected thereto and located within said third pipe to control electric current flowing through said heat tape in response to predetermined temperature variations.

* * * * *